United States Patent
Villanueva Berindoague et al.

(10) Patent No.: US 11,612,897 B2
(45) Date of Patent: Mar. 28, 2023

(54) ALKYLATED TRIPHENYL PHOSPHOROTHIONATES AS SELECTIVE METAL SULPHIDE COLLECTORS

(71) Applicant: BASF SE, Ludwigshafen am Rhein (DE)

(72) Inventors: Adrian Mauricio Villanueva Berindoague, Ludwigshafen (DE); Alexej Michailovski, Ludwigshafen (DE); Scott Alexander Dickie, Auckland (NZ); Daniel Chipfunhu, Waterford (AU)

(73) Assignee: BASF SE, Ludwigshafen am Rhein (DE)

( * ) Notice: Subject to any disclaimer, the term of this patent is extended or adjusted under 35 U.S.C. 154(b) by 663 days.

(21) Appl. No.: 16/614,642

(22) PCT Filed: May 23, 2018

(86) PCT No.: PCT/EP2018/063444
§ 371 (c)(1),
(2) Date: Nov. 18, 2019

(87) PCT Pub. No.: WO2018/215509
PCT Pub. Date: Nov. 29, 2018

(65) Prior Publication Data
US 2020/0147619 A1 May 14, 2020

(30) Foreign Application Priority Data
May 24, 2017 (EP) .................. PCT/EP2017/062640

(51) Int. Cl.
*B03D 1/01* (2006.01)
*B01D 21/18* (2006.01)
*B03D 1/014* (2006.01)

(52) U.S. Cl.
CPC ............. *B03D 1/014* (2013.01); *B01D 21/18* (2013.01); *B03D 2201/02* (2013.01); *B03D 2203/025* (2013.01); *B03D 2203/04* (2013.01)

(58) Field of Classification Search
CPC ................ B03D 1/014; B03D 2201/02; B03D 2203/025; B03D 2203/04;
(Continued)

(56) References Cited

U.S. PATENT DOCUMENTS 3,570,772 A * 3/1971 Booth .................... B03D 1/014
209/901
3,925,218 A * 12/1975 Zipperian .............. B03D 1/014
252/61

(Continued)

FOREIGN PATENT DOCUMENTS

| CL | 199100514 | 6/1991 |
| CL | 198500358 | 6/1995 |

(Continued)

OTHER PUBLICATIONS

"Phosphorothiolate", Author unknown, published in https://pubchem.ncbi.nlm.nih.gov., Dec. 5, 2007 (Year: 2007)*
(Continued)

*Primary Examiner* — Joseph W Drodge
(74) *Attorney, Agent, or Firm* — Grüneberg and Myers, PLLC

(57) ABSTRACT

The present invention is directed to a method for selectively recovering a sulphide mineral from an ore applying a collector being an alkylated triphenyl phosphorothionate. Further, the present invention is directed to the use of said alkylated triphenyl phosphorothionates to separate a target mineral from iron sulphide and/or silicate gangue.

19 Claims, 3 Drawing Sheets

Recovery of Cu as a function of grade

(58) Field of Classification Search
CPC .......... B03D 2201/002; B03D 2203/02; B01D 21/01; B01D 21/18; C02F 1/52; C02F 1/542
See application file for complete search history.

(56) References Cited

U.S. PATENT DOCUMENTS

| | | | | |
|---|---|---|---|---|
| 4,530,758 A * | 7/1985 | Tibbals | ................. | B03D 1/012 |
| | | | | 252/61 |
| 4,587,013 A * | 5/1986 | Nagaraj | ................. | B03D 1/014 |
| | | | | 252/61 |
| 4,735,711 A * | 4/1988 | Klimpel | ................. | B03D 1/012 |
| | | | | 252/61 |
| 4,793,852 A * | 12/1988 | Harris | ..................... | C01G 1/12 |
| | | | | 252/61 |
| 4,879,022 A * | 11/1989 | Clark | ..................... | B03D 1/02 |
| | | | | 252/61 |
| 4,929,344 A | 5/1990 | Fleming | | |
| 2009/0191420 A1* | 7/2009 | O'Donoghue | .......... | B41M 5/26 |
| | | | | 427/559 |
| 2010/0233050 A1* | 9/2010 | Gargulak | ................. | C22B 1/00 |
| | | | | 252/61 |
| 2012/0028861 A1* | 2/2012 | Douglas | ............... | C10M 137/04 |
| | | | | 508/423 |
| 2013/0092603 A1* | 4/2013 | Nagaraj | ................. | B03D 1/014 |
| | | | | 252/61 |
| 2013/0092604 A1 | 4/2013 | Nagaraj et al. | | |
| 2015/0209801 A1* | 7/2015 | Tall | ........................ | B03D 1/012 |
| | | | | 252/61 |

FOREIGN PATENT DOCUMENTS

| | | |
|---|---|---|
| CL | 201400986 | 4/2014 |
| EP | 0 000 757 A1 | 2/1979 |
| EP | 0 413 661 A2 | 2/1991 |

OTHER PUBLICATIONS

Chilean Office Action dated Apr. 21, 2021 in Chilean Application No. 201903314.
International Search Report and Written Opinion dated Aug. 29, 2018 in PCT/EP2018/063444 filed on May 23, 2018.

* cited by examiner

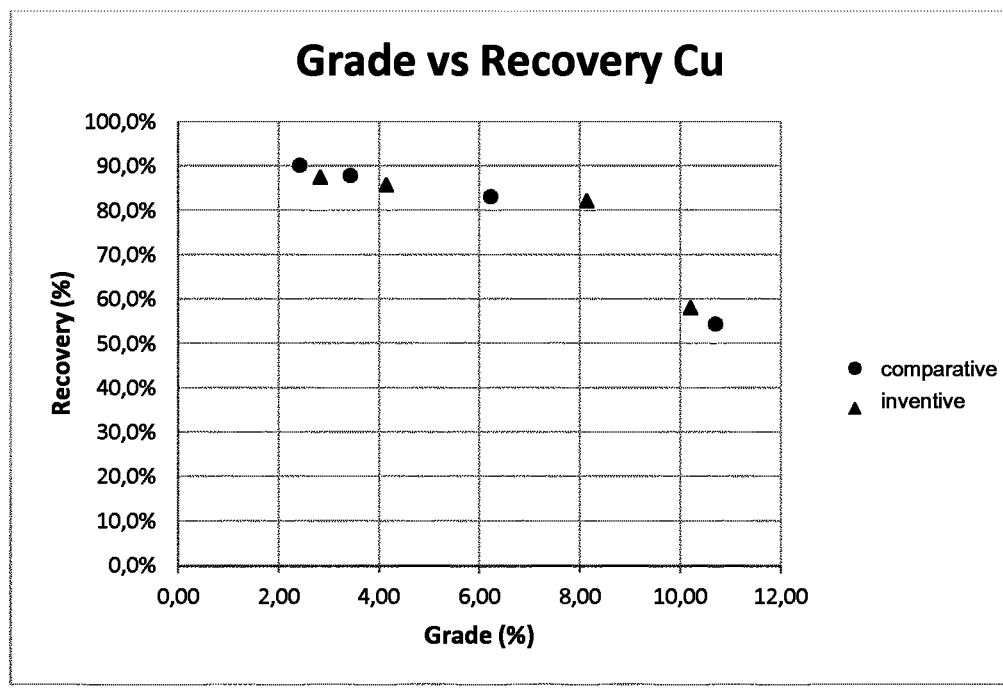
Fig. 1  Recovery of Cu as a function of grade
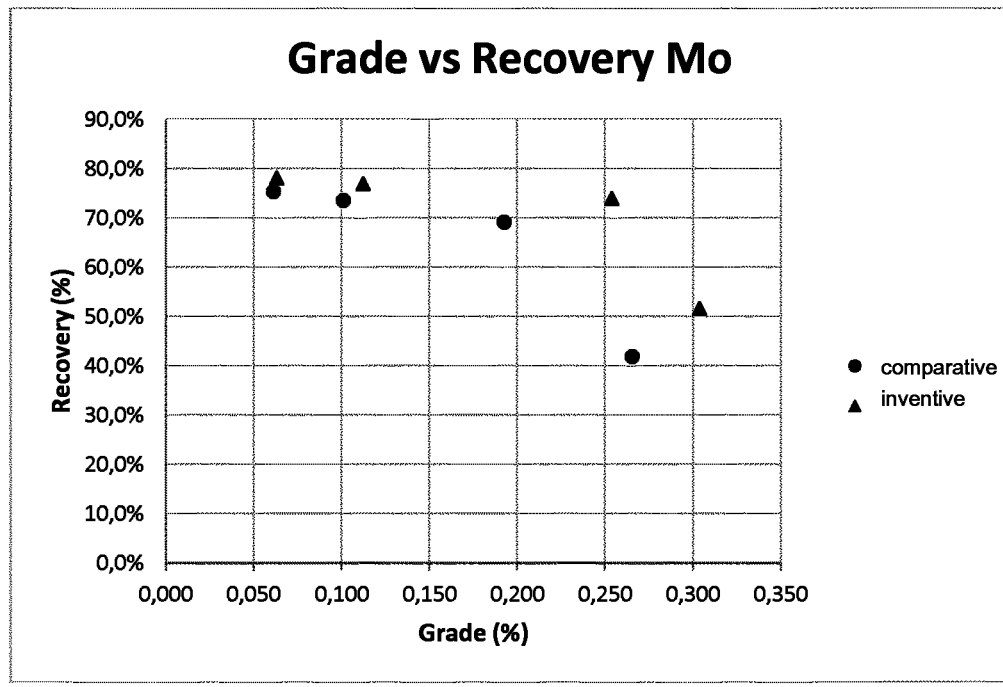
Fig. 2  Recovery of Mo as a function of grade

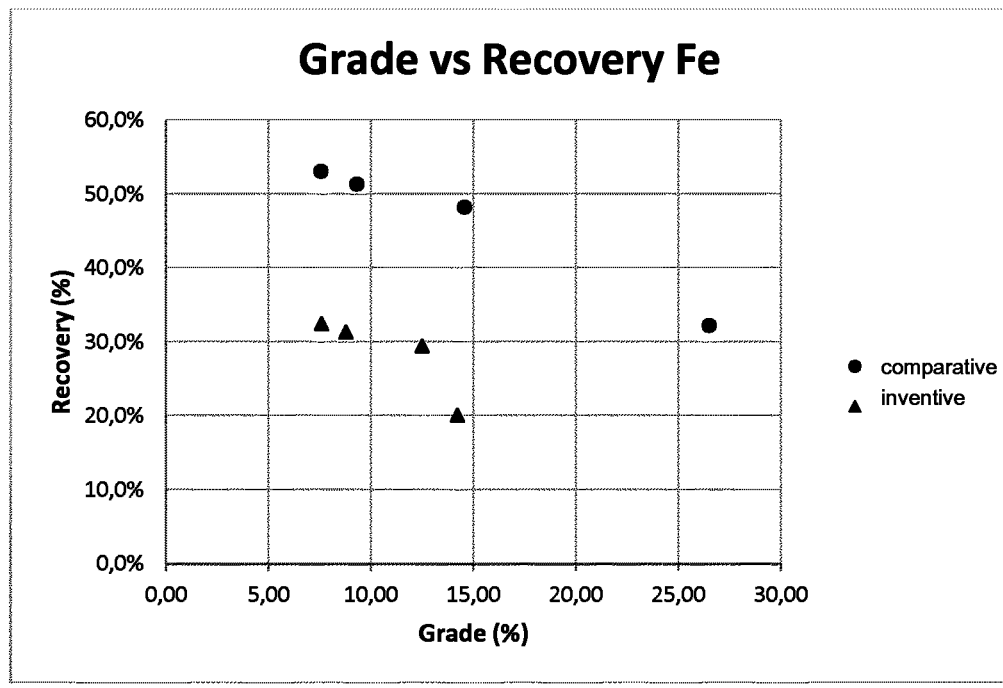
Fig. 3 Recovery of Fe as a function of grade
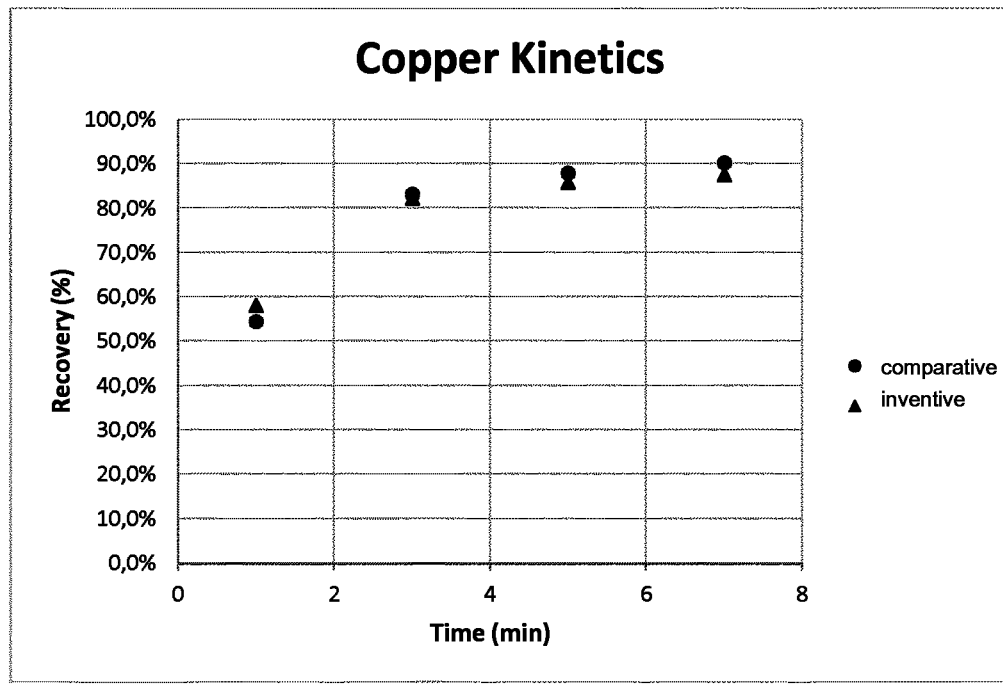
Fig. 4 Recovery of Cu as a function of time

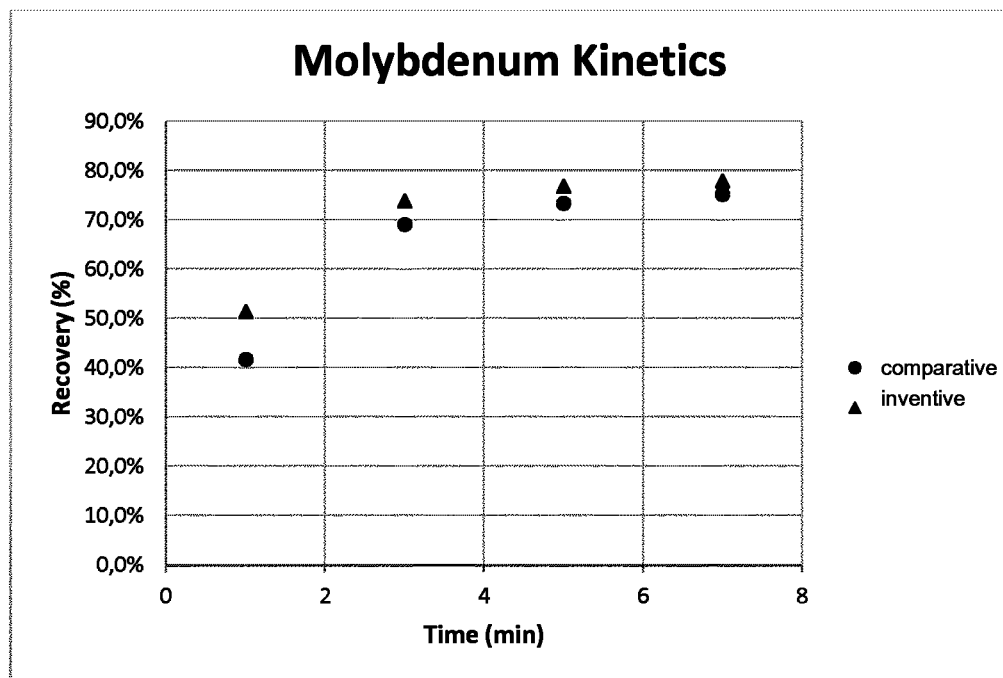
Fig. 5  Recovery of Mo as a function of time
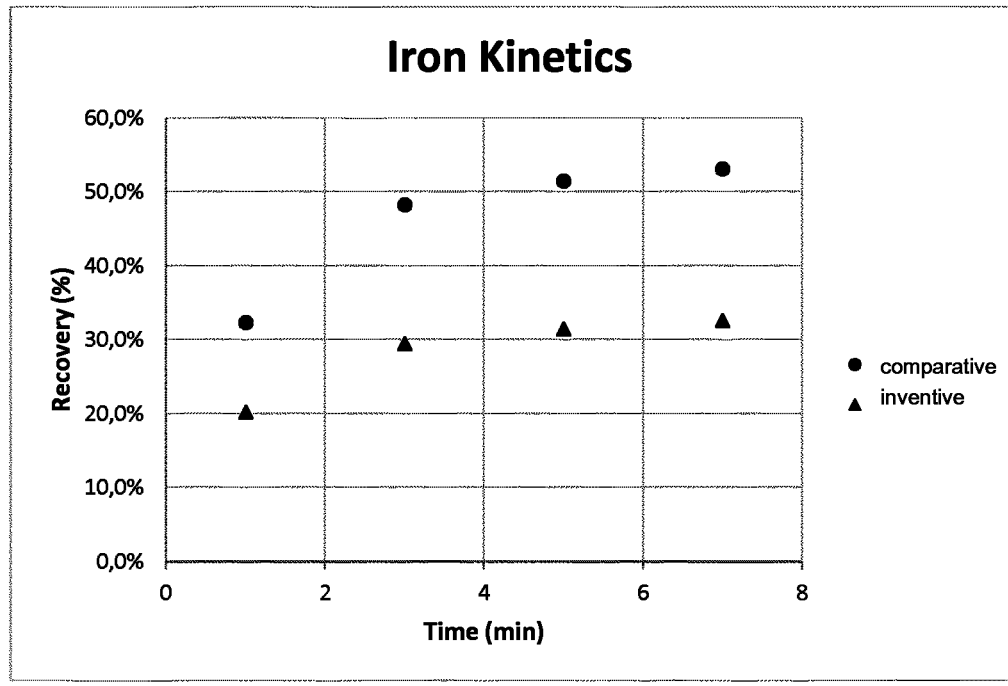
Fig. 6  Recovery of Fe as a function of time

ALKYLATED TRIPHENYL PHOSPHOROTHIONATES AS SELECTIVE METAL SULPHIDE COLLECTORS

FIELD OF THE INVENTION

The present invention is directed to a method for selectively recovering a sulphide mineral from an ore applying a collector being an alkylated triphenyl phosphorothionate. Further, the present invention is directed to the use of said alkylated triphenyl phosphorothionates to separate a target mineral from iron sulphide and/or silicate gangue.

BACKGROUND OF THE INVENTION

Beneficiation or upgrade of sulphide ores is normally achieved by the industrial application of the froth flotation process wherein valuable metal sulphide contained in the ore are separated from gangue and low valuable sulphides via selective hydrophobization.

Froth flotation is one of the most widely used separation processes for the upgrading of ores. With the steady depletion of high grade ores which are easily processable, the exploitation of low grade, more complex and disseminated ore reserves has become necessary. This has forced the mineral processing industry to adopt more sophisticated and innovative separation technologies for concentrating valuable minerals. In terms of flotation, the development of more selective collectors is critical to its success in treating these low grade, difficult-to-process ores.

Selectivity in froth flotation is controlled by the selective adsorption of reagents on minerals at the mineral/water interface. Reagents that impart sufficient hydrophobic character to minerals on adsorption such that they are rendered floatable are referred to as collectors. The finely ground ore is normally treated with thiol reagents such as xanthates, dithiophosphatates or thionocarbamates which induce hydrophobization in the target mineral phases. The efficiency of the selective adsorption is pH dependent. When iron sulphide ($FeS_2$ or pyrite) is present in large quantities in the ore phase, an effective separation is only possible at high pH levels. This requires the addition of large amounts of pH modifiers such as NaOH or CaO which involves additional costs. Besides, the results achieved with said collectors are often unsatisfactory.

Accordingly, there is a need in the art for a method for the selective separation of valuable metal sulphides from ores containing large amounts of iron sulphide.

Thus, it is an object of the present invention to provide a method for selectively recovering a sulphide mineral from an ore which does not require additional modifiers.

SUMMARY OF THE INVENTION

The foregoing and other objects are solved by the subject-matter of the present invention.

According to a first aspect of the present invention, a method for selectively recovering a sulphide mineral from an ore, comprising the steps of
i) grinding the ore,
ii) preparing a pulp of the ground ore obtained in step i),
iii) adding at least one collector comprising an alkylated triphenyl phosphorothionate, and
iv) subjecting the pulp containing the collector obtained in step iii) to froth flotation is provided.

It was surprisingly found by the inventors that alkylated triphenyl phosohorothionates can be effectively used to achieve a highly efficient separation of valuable metal sulphides from both silicate gangue and iron sulphides at a significantly lower pH level when compared to other thiol reagents traditionally used in the industrial practice at similar or even lower dose rates.

Accordingly, it is especially preferred that the ore comprises iron sulphide gangue and/or silicate gangue.

According to another aspect of the present invention, the at least one collector is an alkylated triphenyl phosphorothionate of formula (I)

wherein $R^1$ is $C_6$-$C_{10}$ aryl substituted with at least one linear or branched $C_1$-$C_{20}$ alkyl, and $R^2$ and $R^3$ are independently from each other hydrogen, linear or branched $C_1$-$C_{20}$ alkyl or $C_6$-$C_{10}$ aryl which is unsubstituted or substituted with one or more linear or branched $C_1$-$C_{20}$ alkyl.

According to a further aspect of the present invention, the at least one collector is an alkylated triphenyl phosphorothionate of formula (Ia)

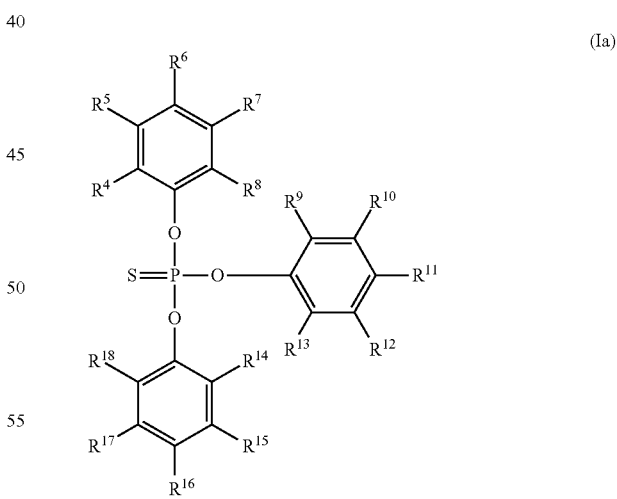

wherein $R^4$ to $R^{18}$ are independently from each other hydrogen or linear or branched $C_1$-$C_{20}$ alkyl with the proviso that at least one of $R^4$ to $R^{18}$ is linear or branched $C_1$-$C_{20}$ alkyl.

According to still another aspect of the present invention, the at least one collector is an alkylated triphenyl phosphorothionate of formula (Ib)

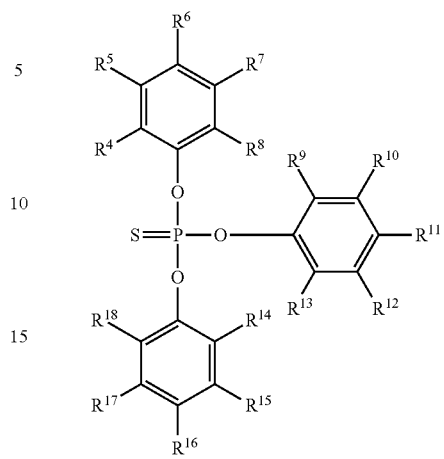

(Ia)

wherein $R^4$ to $R^{18}$ are independently from each other hydrogen or linear or branched $C_1$-$C_{20}$ alkyl with the proviso that at least one of $R^4$ to $R^8$, at least one of $R^9$ to $R^{13}$ and at least one of $R^{14}$ to $R^{18}$ are linear or branched $C_1$-$C_{20}$ alkyl.

According to still another aspect of the present invention, the at least one collector is an alkylated triphenyl phosphorothionate of formula (Ib)

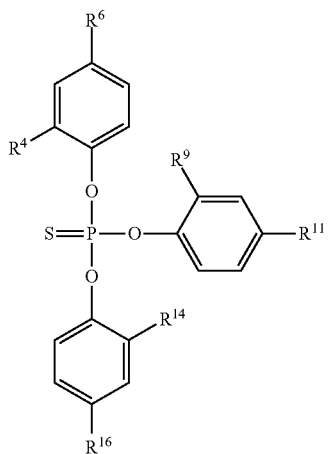

(Ib)

wherein $R^4$, $R^6$, $R^9$, $R^{11}$, $R^{14}$ and/or $R^{16}$ are independently from each other hydrogen or linear or branched $C_1$-$C_{20}$ alkyl with the proviso that at least one of $R^4$, $R^6$, $R^9$, $R^{11}$, $R^{14}$ and/or $R^{16}$ is linear or branched $C_1$-$C_{20}$ alkyl.

According to another aspect of the present invention, the at least one collector is an alkylated triphenyl phosphorothionate of formula (Ic)

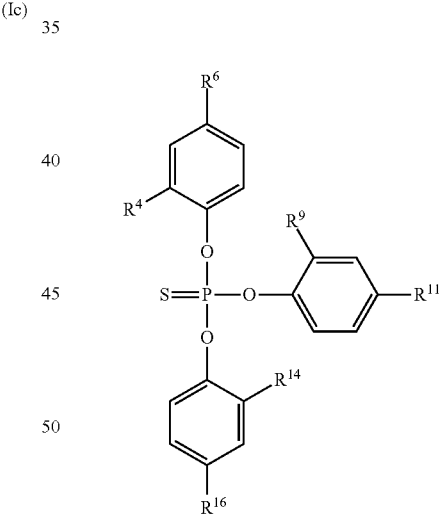

(Ib)

wherein $R^4$, $R^6$, $R^9$, $R^{11}$, $R^{14}$ and/or $R^{16}$ are independently from each other hydrogen or linear or branched $C_1$-$C_{20}$ alkyl with the proviso that at least one of $R^4$ and $R^6$, at least one of $R^9$ and $R^{11}$ and at least one of $R^{14}$ and $R^{16}$ are linear or branched $C_1$-$C_{20}$ alkyl.

According to another aspect of the present invention, the at least one collector is an alkylated triphenyl phosphorothionate of formula (Ic)

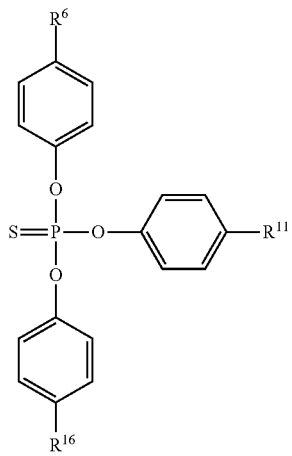

(Ic)

wherein $R^6$, $R^{11}$, and/or $R^{16}$ are independently from each other hydrogen or linear or branched $C_1$-$C_{20}$ alkyl with the proviso that at least one of $R^6$, $R^{11}$ and/or $R^{16}$ is linear or branched $C_1$-$C_{20}$ alkyl.

According to a further aspect of the present invention, $R^1$, $R^2$ and $R^3$ of formula (I) are phenyl substituted with at least one linear or branched $C_1$-$C_{20}$ alkyl.

According to a further aspect of the present invention, the at least one collector is an alkylated triphenyl phosphorothionate of formula (Ia)

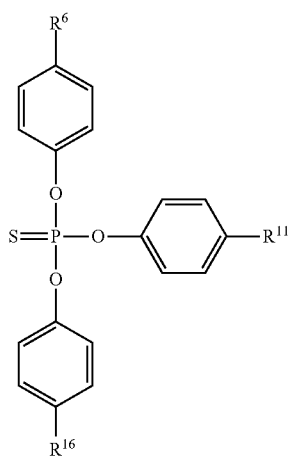
(Ic)

wherein $R^6$, $R^{11}$, and/or $R^{16}$ are independently from each other linear or branched $C_1$-$C_{20}$ alkyl.

The substituents $R^6$, $R^{11}$ and $R^{16}$ can be different or identical, the latter being preferred.

Therefore, according to one aspect of the present invention, the at least one collector is an alkylated triphenyl phosphorothionate of formula (Id)

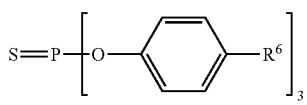
(Id)

wherein $R^6$ is linear or branched $C_1$-$C_{20}$ alkyl

According to a further aspect of the present invention, $R^6$ is methyl, ethyl, n-propyl, iso-propyl, n-butyl, sec-butyl, tert.-butyl, n-pentyl, 1-methylbutyl, n-hexyl, 1-methylpentyl, n-heptyl, 1-methylhexyl, n-ocyl, n-nonyl, iso-nonyl, n-decyl, n-dodecyl and/or iso-dodecyl.

Preferably, $R^6$ is branched $C_3$-$C_{20}$ alkyl, more preferably branched $C_4$-$C_{12}$ alkyl.

It is particularly preferred that $R^6$ is tert.-butyl, iso-nonyl or iso-dodecyl.

It is especially preferred that the at least one collector is an alkylated triphenyl phosphorothionate of formulas (II) to (V):

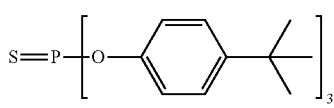
(II)

According to one aspect of the present invention, the collector further comprises at least one linear or branched $C_1$-$C_{10}$ alcohol.

It is especially preferred that the at least one linear or branched $C_1$-$C_{10}$ alcohol is selected from the group consisting of 1-butanol, isononanol, 2-ethylhexanol, 2-propylheptanol or mixtures thereof.

According to another aspect of the present invention, the collector further comprises a surfactant.

It is especially preferred that the surfactant is an ethoxylated branched oxoalcohol or ethoxylated fatty alcohols of formula (IV)

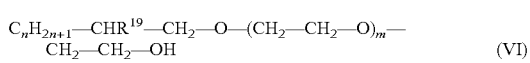
(VI)

with $R^{19}$=H or $C_1$-$C_{10}$ alkyl, n in the range of 10 to 15 and m in the range of 3 to 8.

According to still another aspect of the present invention, the pulp containing the collector obtained in step iii) has a pH value in the range of 8 to 12.

According to a further aspect of the present invention, the ore comprises copper, molybdenum, zinc, lead, silver, gold, nickel, ruthenium, osmium, rhodium, iridium, palladium, platinum or mixtures thereof and iron.

The present invention is further directed to the use of a collector as described above to separate a target mineral from iron sulphide gangue and/or silicate gangue.

It is especially preferred that the target mineral contains copper, molybdenum, zinc, lead, silver, gold, nickel, ruthenium, osmium, rhodium, iridium, palladium and/or platinum.

In the following, the present invention is described in more detail.

DETAILED DESCRIPTION OF THE INVENTION

According to a first aspect of the present invention, a method for selectively recovering a sulphide mineral from an ore, comprising the steps of i) grinding the ore,
ii) preparing a pulp of the ground ore obtained in step i),
iii) adding at least one collector comprising an alkylated triphenyl phosphorothionate, and
iv) subjecting the pulp containing the collector obtained in step iii) to froth flotation is provided.

The ore is preferably a sulfide containing ore comprising metal sulfides like copper, molybdenum, zinc, lead, silver, gold, nickel, ruthenium, osmium, rhodium, iridium, palladium and/or platinum—containing minerals. In particular, it is preferred that the ore comprises sulphides of copper and/or molybdenum.

The ore may further comprise iron- and/or silica-containing gangue. Preferably, the ore comprises gangue being iron sulfides as pyrite.

According to step i) of the inventive method, the ore is subjected to a grinding process in accordance with conventional procedures to achieve an economical degree of liberation to allow an efficient separation of the valuable minerals from the gangue materials.

Prior to mineral recovery, it is preferred that the pH is adjusted to a predetermined value where flotation selectivity of the target metal is at a maximum. Therefore, a pH modifier such as NaOH or CaO is preferably added to the ore during the grinding process in order to adjust the pH to a range of 8.0 to 12.0, more preferably to a range of 9.0 to 10.0, still more preferably to a range of 9.3 to 9.7.

The grinded ore is subsequently mixed with water to form a pulp. The pulp preferably has a solid content between 15 wt.-% to 40 wt.-%, more preferably at least 25 wt.-%, still more preferably at least 30 wt.-%.

According to step iii) of the inventive process, a collector comprising an alkylated triphenyl phosphorothionate is added to the pulp.

It is preferred that said alkylated triphenyl phosphorothionate is an alkylated triphenyl phosphorothionate of formula (I)

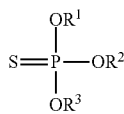

(I)

wherein
$R^1$ is $C_6$-$C_{10}$ aryl or heteroaryl substituted with at least one linear or branched $C_1$-$C_{20}$ alkyl, more preferably linear or branched $C_3$-$C_{10}$ alkyl, still more preferably methyl, ethyl, n-propyl, iso-propyl, n-butyl, sec-butyl, tert-butyl, n-pentyl, 1-methylbutyl, n-hexyl, 1-methylpentyl, n-heptyl, 1-methylhexyl, n-ocyl, n-nonyl, iso-nonyl, n-decyl, n-dodecyl and/or iso-dodecyl, yet more preferably branched $C_3$-$C_{10}$ alkyl, like iso-propyl, n-butyl, sec-butyl, tert-butyl, 1-methylbutyl, 1-methylpentyl, 1-methylhexyl, iso-nonyl and/or iso-dodecyl, and
$R^2$ and $R^3$ are independently from each other hydrogen, linear or branched $C_1$-$C_{20}$ alkyl or $C_6$-$C_{10}$ aryl which is unsubstituted or substituted with one or more linear or branched $C_1$-$C_{20}$ alkyl, more preferably linear or branched $C_3$-$C_{10}$ alkyl, still more preferably methyl, ethyl, n-propyl, iso-propyl, n-butyl, sec-butyl, tert-butyl, n-pentyl, 1-methylbutyl, n-hexyl, 1-methylpentyl, n-heptyl, 1-methylhexyl, n-ocyl, n-nonyl, iso-nonyl n-decyl, n-dodecyl and/or iso-dodecyl, yet more preferably branched $C_3$-$C_{10}$ alkyl, like iso-propyl, n-butyl, sec-butyl, tert-butyl, 1-methylbutyl, 1-methylpentyl, 1-methylhexyl iso-nonyl and/or iso-dodecyl.

Preferably, $R^1$ is phenyl or naphtyl substituted with at least one linear or branched $C_1$-$C_{20}$ alkyl, more preferably linear or branched $C_3$-$C_{10}$ alkyl, still more preferably methyl, ethyl, n-propyl, iso-propyl, n-butyl, sec-butyl, tert-butyl, n-pentyl, 1-methylbutyl, n-hexyl, 1-methylpentyl, n-heptyl, 1-methylhexyl, n-ocyl, n-nonyl, iso-nonyl n-decyl, n-dodecyl and/or iso-dodecyl, yet more preferably branched $C_3$-$C_{10}$ alkyl, like iso-propyl, n-butyl, sec-butyl, tert-butyl, 1-methylbutyl, 1-methylpentyl, 1-methylhexyl and/or iso-nonyl, and $R^2$ and $R^3$ are independently from each other hydrogen, linear or branched $C_1$-$C_{20}$ alkyl or phenyl or naphtyl substituted with at least one linear or branched $C_1$-$C_{20}$ alkyl, more preferably linear or branched $C_3$-$C_{10}$ alkyl, still more preferably methyl, ethyl, n-propyl, iso-propyl, n-butyl, sec-butyl, tert-butyl, n-pentyl, 1-methylbutyl, n-hexyl, 1-methylpentyl, n-heptyl, 1-methylhexyl, n-ocyl, n-nonyl, iso-nonyl, n-decyl, n-dodecyl and/or iso-dodecyl, yet more preferably branched $C_3$-$C_{10}$ alkyl, like iso-propyl, n-butyl, sec-butyl, tert-butyl, 1-methylbutyl, 1-methylpentyl, 1-methylhexyl iso-nonyl and/or iso-dodecyl.

More preferably, $R^1$ is phenyl substituted with at least one linear or branched $C_1$-$C_{20}$ alkyl, and $R^2$ and $R^3$ are independently from each other hydrogen, linear or branched $C_1$-$C_{20}$ alkyl or phenyl substituted with at least one linear or branched $C_1$-$C_{20}$ alkyl.

Therefore, according to a preferred embodiment of the present invention, the collector comprises an alkylated triphenyl phosphorothionate of formula (Ia),

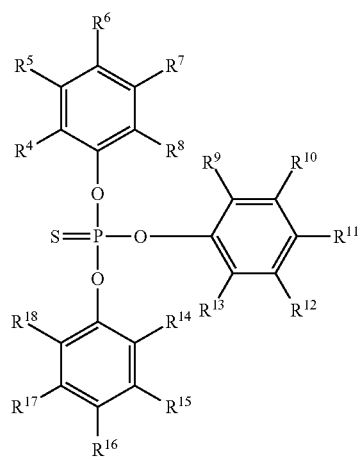

(Ia)

wherein $R^4$ to $R^{18}$ are independently from each other hydrogen or linear or branched $C_1$-$C_{20}$ alkyl with the proviso that at least one of $R^4$ to $R^{18}$ is linear or branched $C_1$-$C_{20}$ alkyl.

According to a preferred embodiment of the present invention, at least one of $R^4$ to $R^{18}$ is linear or branched $C_3$-$C_{12}$ alkyl.

It is preferred that at least one of $R^4$ to $R^{18}$ is n-propyl, iso-propyl, n-butyl, sec-butyl, tert-butyl, n-pentyl, 1-methylbutyl, n-hexyl, 1-methylpentyl, n-heptyl, 1-methylhexyl, n-ocyl, n-nonyl, iso-nonyl, n-decyl, n-dodecyl and/or iso-dodecyl.

It is particularly preferred that at least one of $R^4$ to $R^{18}$ is branched $C_3$-$C_{12}$ alkyl. Accordingly, it is preferred that at least one of $R^4$ to $R^{18}$ is iso-propyl, n-butyl, sec-butyl, tert-butyl, 1-methylbutyl, 1-methylpentyl, 1-methylhexyl, iso-nonyl and/or iso-dodecyl.

According to an especially preferred embodiment of the present invention, at least one of $R^4$ to $R^{18}$ is tert-butyl, iso-nonyl and/or iso-dodecyl.

It is especially preferred that at least one of $R^4$, $R^6$, $R^9$, $R^{11}$, $R^{14}$ and/or $R^{16}$ is linear or branched $C_1$-$C_{20}$ alkyl. Accordingly, it is preferred that the collector comprises an alkylated triphenyl phosphorothionate of formula (Ib)

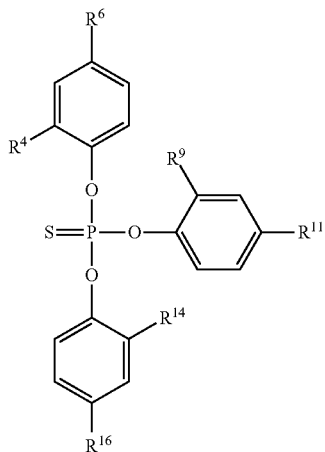

(Ib)

wherein $R^4$, $R^6$, $R^9$, $R^{11}$, $R^{14}$ and/or $R^{16}$ are independently from each other hydrogen or linear or branched $C_1$-$C_{20}$ alkyl with the proviso that at least one of $R^4$, $R^6$, $R^9$, $R^{11}$, $R^{14}$ and/or $R^{16}$ is linear or branched $C_1$-$C_{20}$ alkyl.

According to a preferred embodiment of the present invention, at least one of $R^4$, $R^6$, $R^9$, $R^{11}$, $R^{14}$ and/or $R^{16}$ is linear or branched $C_3$-$C_{12}$ alkyl.

It is preferred that at least one of $R^4$, $R^6$, $R^9$, $R^{11}$, $R^{14}$ and/or $R^{16}$ is n-propyl, iso-propyl, n-butyl, sec-butyl, tert-butyl, n-pentyl, 1-methylbutyl, n-hexyl, 1-methylpentyl, n-heptyl, 1-methylhexyl, n-ocyl, n-nonyl, iso-nonyl, n-decyl, n-dodecyl and/or iso-dodecyl.

It is particularly preferred that at least one of $R^4$, $R^6$, $R^9$, $R^{11}$, $R^{14}$ and/or $R^{16}$ is branched $C_3$-$C_{12}$ alkyl. Accordingly, it is preferred that at least one of $R^4$, $R^6$, $R^9$, $R^{11}$, $R^{14}$ and/or $R^{16}$ is iso-propyl, n-butyl, sec-butyl, tert-butyl, 1-methylbutyl, 1-methylpentyl, 1-methylhexyl, iso-nonyl and/or iso-dodecyl.

According to an especially preferred embodiment of the present invention, at least one of $R^4$, $R^6$, $R^9$, $R^{11}$, $R^{14}$ and/or $R^{16}$ is tert-butyl, iso-nonyl and/or iso-dodecyl.

It is particularly preferred that at least one of $R^6$, $R^{11}$ and/or $R^{16}$ is linear or branched $C_1$-$C_{20}$ alkyl. Accordingly, it is preferred that the collector comprises an alkylated triphenyl phosphorothionate of formula (Ic)

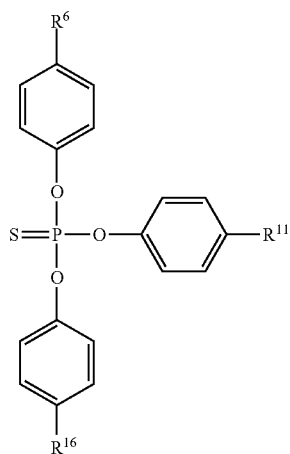

(Ic)

wherein $R^6$, $R^{11}$ and/or $R^{16}$ are independently from each other hydrogen or linear or branched $C_1$-$C_{20}$ alkyl with the proviso that at least one of $R^6$, $R^{11}$ and/or $R^{16}$, like at least two of $R^6$, $R^{11}$ and/or $R^{16}$ or all of $R^6$, $R^{11}$ and $R^{16}$ is linear or branched $C_1$-$C_{20}$ alkyl.

Preferably, at least one of $R^6$, $R^{11}$ and/or $R^{16}$ like at least two of $R^6$, $R^{11}$ and/or $R^{16}$ or all of $R^6$, $R^{11}$ and $R^{16}$ is linear or branched $C_1$-$C_{12}$ alkyl. More preferably, at least one of $R^6$, $R^{11}$ and/or $R^{16}$, like at least two of $R^6$, $R^{11}$ and/or $R^{16}$ or all of $R^6$, $R^{11}$ and $R^{16}$, is n-propyl, iso-propyl, n-butyl, sec-butyl, tert-butyl, n-pentyl, 1-methylbutyl, n-hexyl, 1-methylpentyl, n-heptyl, 1-methylhexyl, n-ocyl, n-nonyl, iso-nonyl n-decyl, n-dodecyl and/or iso-dodecyl. Still more preferably, at least one of $R^6$, $R^{11}$ and/or $R^{16}$, like at least two of $R^6$, $R^{11}$ and/or $R^{16}$ or all of $R^6$, $R^{11}$ and $R^{16}$ is branched $C_3$-$C_{12}$ alkyl, like iso-propyl, n-butyl, sec-butyl, tert-butyl, 1-methylbutyl, 1-methylpentyl, 1-methylhexyl, iso-nonyl and/or iso-dodecyl. It is especially preferred that at least one of $R^6$, $R^{11}$ and/or $R^{16}$, like at least two of $R^6$, $R^{11}$ and/or $R^{16}$ or all of $R^6$, $R^{11}$ and $R^{16}$ is tert-butyl, iso-nonyl and/or iso-dodecyl.

According to another preferred embodiment of the present invention, the alkylated triphenyl phosphorothionate is an alkylated triphenyl phosphorothionate of formula (I) wherein $R^1$, $R^2$ and $R^3$ are independently from each other $C_6$-$C_{10}$ aryl or heteroaryl substituted with at least one linear or branched $C_1$-$C_{20}$ alkyl, more preferably linear or branched $C_3$-$C_{10}$ alkyl, still more preferably methyl, ethyl, n-propyl, iso-propyl, n-butyl, sec-butyl, tert-butyl, n-pentyl, 1-methylbutyl, n-hexyl, 1-methylpentyl, n-heptyl, 1-methylhexyl, n-ocyl, n-nonyl, iso-nonyl, n-decyl, n-dodecyl and/or iso-dodecyl, yet more preferably branched $C_3$-$C_{10}$ alkyl, like iso-propyl, n-butyl, sec-butyl, tert-butyl, 1-methylbutyl, 1-methylpentyl, 1-methylhexyl, iso-nonyl and/or iso-dodecyl.

Preferably, $R^1$, $R^2$ and $R^3$ are independently from each other phenyl or naphtyl substituted with at least one linear or branched $C_1$-$C_{20}$ alkyl, more preferably linear or branched $C_3$-$C_{10}$ alkyl, still more preferably methyl, ethyl, n-propyl, iso-propyl, n-butyl, sec-butyl, tert-butyl, n-pentyl, 1-methylbutyl, n-hexyl, 1-methylpentyl, n-heptyl, 1-methylhexyl, n-ocyl, n-nonyl, iso-nonyl n-decyl, n-dodecyl and/or iso-dodecyl, yet more preferably branched $C_3$-$C_{10}$ alkyl, like iso-propyl, n-butyl, sec-butyl, tert-butyl, 1-methylbutyl, 1-methylpentyl, 1-methylhexyl and/or iso-nonyl.

It is especially preferred that $R^1$, $R^2$ and $R^3$ are phenyl substituted with at least one linear or branched $C_1$-$C_{20}$ alkyl.

Therefore, according to a preferred embodiment of the present invention, the collector comprises an alkylated triphenyl phosphorothionate of formula (Ia),

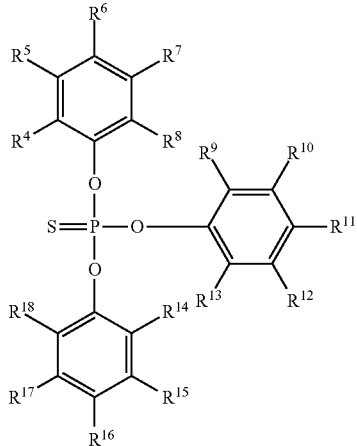

(Ia)

wherein $R^4$ to $R^{18}$ are independently from each other hydrogen or linear or branched $C_1$-$C_{20}$ alkyl with the proviso that at least one of $R^4$ to $R^8$, at least one of $R^9$ to $R^{13}$ and at least one of $R^{14}$ to $R^{18}$ are linear or branched $C_1$-$C_{20}$ alkyl.

According to a preferred embodiment of the present invention, at least one of $R^4$ to $R^8$, at least one of $R^9$ to $R^{13}$ and at least one of $R^{14}$ to $R^{18}$ are linear or branched $C_3$-$C_{12}$ alkyl.

It is preferred that at least one of $R^4$ to $R^8$, at least one of $R^9$ to $R^{13}$ and at least one of $R^{14}$ to $R^{18}$ are n-propyl, iso-propyl, n-butyl, sec-butyl, tert-butyl, n-pentyl, 1-methylbutyl, n-hexyl, 1-methylpentyl, n-heptyl, 1-methylhexyl, n-ocyl, n-nonyl, iso-nonyl, n-decyl, n-dodecyl and/or iso-dodecyl.

It is particularly preferred that at least one of $R^4$ to $R^8$, at least one of $R^9$ to $R^{13}$ and at least one of $R^{14}$ to $R^{18}$ are branched $C_3$-$C_{12}$ alkyl. Accordingly, it is preferred that at least one of $R^4$ to $R^8$, at least one of $R^9$ to $R^{13}$ and at least one of $R^{14}$ to $R^{18}$ are iso-propyl, n-butyl, sec-butyl, tert-butyl, 1-methylbutyl, 1-methylpentyl, 1-methylhexyl, iso-nonyl and/or iso-dodecyl.

According to an especially preferred embodiment of the present invention, at least one of $R^4$ to $R^8$, at least one of $R^9$ to $R^{13}$ and at least one of $R^{14}$ to $R^{18}$ are tert-butyl, iso-nonyl and/or iso-dodecyl.

It is especially preferred that at least one of $R^4$ and $R^6$, at least one of $R^9$ and $R^{11}$ and at least one of $R^{14}$ and $R^{16}$ are linear or branched $C_1$-$C_{20}$ alkyl. Accordingly, it is preferred that the collector comprises an alkylated triphenyl phosphorothionate of formula (Ib)

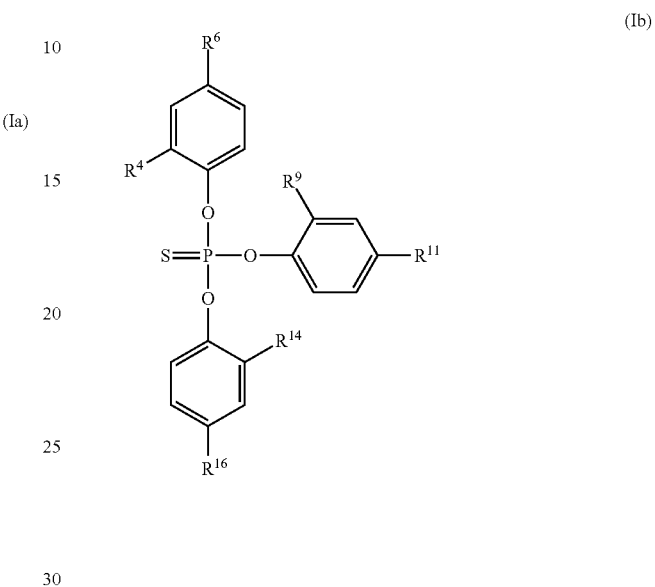

(Ib)

wherein $R^4$, $R^6$, $R^9$, $R^{11}$, $R^{14}$ and/or $R^{16}$ are independently from each other hydrogen or linear or branched $C_1$-$C_{20}$ alkyl with the proviso that at least one of $R^4$ and $R^6$, at least one of $R^9$ and $R^{11}$ and at least one of $R^{14}$ and $R^{16}$ are linear or branched $C_1$-$C_{20}$ alkyl.

According to a preferred embodiment of the present invention, at least one of $R^4$ and $R^6$, at least one of $R^9$ and $R^{11}$ and at least one of $R^{14}$ and $R^{16}$ are linear or branched $C_3$-$C_{12}$ alkyl.

It is preferred that at least one of $R^4$ and $R^6$, at least one of $R^9$ and $R^{11}$ and at least one of $R^{14}$ and $R^{16}$ are n-propyl, iso-propyl, n-butyl, sec-butyl, tert-butyl, n-pentyl, 1-methylbutyl, n-hexyl, 1-methylpentyl, n-heptyl, 1-methylhexyl, n-ocyl, n-nonyl, iso-nonyl, n-decyl, n-dodecyl and/or iso-dodecyl.

It is particularly preferred that at least one of $R^4$ and $R^6$, at least one of $R^9$ and $R^{11}$ and at least one of $R^{14}$ and $R^{16}$ are branched $C_3$-$C_{12}$ alkyl. Accordingly, it is preferred that at least one of $R^4$ and $R^6$, at least one of $R^9$ and $R^{11}$ and at least one of $R^{14}$ and $R^{16}$ are iso-propyl, n-butyl, sec-butyl, tert-butyl, 1-methylbutyl, 1-methylpentyl, 1-methylhexyl, iso-nonyl and/or iso-dodecyl.

According to an especially preferred embodiment of the present invention, at least one of $R^4$ and $R^6$, at least one of $R^9$ and $R^{11}$ and at least one of $R^{14}$ and $R^{16}$ are tert-butyl, iso-nonyl and/or iso-dodecyl.

It is particularly preferred that $R^6$, $R^{11}$ and/or $R^{16}$ are independently from each other linear or branched $C_1$-$C_{20}$ alkyl. Accordingly, it is preferred that the collector comprises an alkylated triphenyl phosphorothionate of formula (Ic)

(Ic)

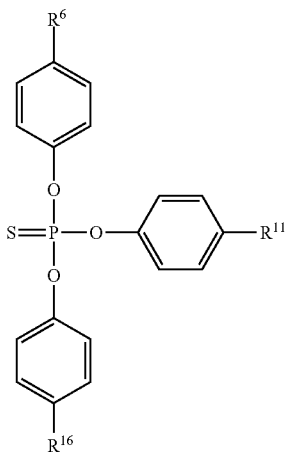

wherein $R^6$, $R^{11}$ and/or $R^{16}$ are independently from each other linear or branched $C_1$-$C_{20}$ alkyl.

Preferably, $R^6$, $R^{11}$ and $R^{16}$ are independently from each other tert-butyl, iso-nonyl and/or iso-dodecyl.

The substituents $R^6$, $R^{11}$ and/or $R^{16}$ of formula (Ic) can be different or identical, the latter being preferred. Accordingly, the collector preferably comprises an alkylated triphenyl phosphorothionate of formula (Id), (Id)

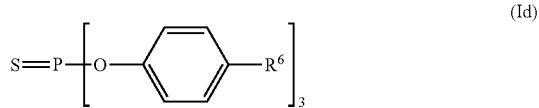

wherein $R^6$ is linear or branched $C_1$-$C_{20}$ alkyl, more preferably linear or branched $C_3$-$C_{12}$ alkyl, still more preferably n-propyl, iso-propyl, n-butyl, sec-butyl, tert-butyl, n-pentyl, 1-methylbutyl, n-hexyl, 1-methylpentyl, n-heptyl, 1-methylhexyl, n-ocyl, n-nonyl, iso-nonyl, n-decyl, n-decyl, n-dodecyl and/or iso-dodecyl, yet more preferably branched $C_3$-$C_{12}$ alkyl, like iso-propyl, n-butyl, sec-butyl, tert-butyl, 1-methylbutyl, 1-methylpentyl, 1-methylhexyl, iso-nonyl or iso-dodecyl.

It is especially preferred that $R^6$ is tert-butyl, iso-nonyl or iso-dodecyl.

Accordingly, it is preferred that the collector according to the present invention is an alkylated triphenyl phosphorothionate of formulas (II) to (V):

(II)

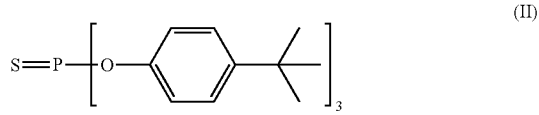

(III)

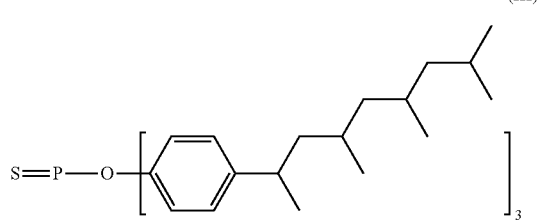

(IV)

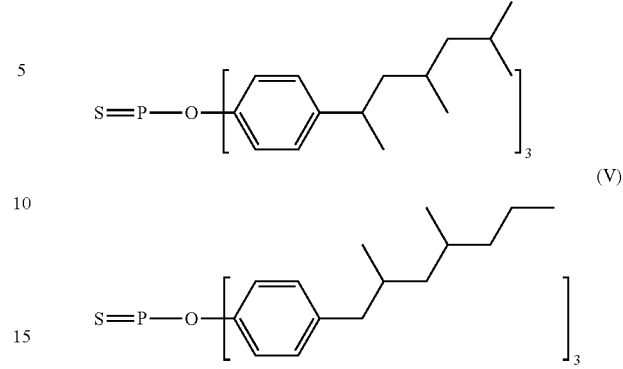

(V)

Preferably, the at least one alkylated triphenyl phosphorothionate is tris[(2 and 4)-C9-C10-isoalkylphenol]-phosphoro-thionate (CAS-No. 126019-82-7) or a mixture of triphenylthiophosphate and tertiary butylated phenyl derivatives (CAS-No. 192268-65-8).

Alkylated triphenyl phosphorothionates are known in the art and can be obtained by sulfurization of the corresponding triphenyl phosphites. A process for the preparation of triphenyl phosphites is described in EP 0 000 757 or EP 0 413 661.

According to one embodiment of the present invention, the collector composition comprises at least 80 wt.-%, more preferably at least 90 wt.-%, still more preferably at least 99 wt.-% of at least one alkylated triphenyl phosphorothionate of formula (I), (Ia), (Ib), (Ic), (Id), or (II) to (V) as described above. It is especially preferred that the collector composition consists of at least one alkylated triphenyl phosphorothionate of formula (I), (Ia), (Ib), (Ic), (Id), or (II) to (V).

However, it was found by the inventors that the amount of recovered valuable metal sulphide is even more increased when the alkylated triphenyl phosphorothionate is applied in diluted form.

Thus, alternatively to the previous paragraph, the collector composition comprises the at least one alkylated triphenyl phosphorothionate of formula (I), (Ia), (Ib), (Ic), (Id), or (II) to (V) in diluted form. In particular, it is preferred that the alkylated triphenyl phosphorothionate is applied as a solution in a linear or branched aliphatic alcohol. Non-limiting examples for linear or branched aliphatic alcohols applicable for the inventive process are linear or branched $C_1$-$C_{10}$ alkylalcohols such as methanol, ethanol, 1-propanol, 1-butanol, tert-butanol, 1-hexanol, 2-ethylhexanol, 1-heptanol, 2-propylheptanol, 1-octanol, isononanol, 1-decanol or mixtures thereof. Especially preferred linear or branched alkylalcohols are 1-butanol, 2-ethylhexanol, 2-propylheptanol, isononanol or mixtures thereof.

The collector composition comprising the at least one alkylated triphenyl phosphorothionate and the linear or branched alkylalcohol preferably comprises, more preferably consists of, 95 to 5 wt.-% of the alkylated triphenyl phosphorothionate of formula (I), (Ia), (Ib), (Ic), (Id), or (II) to (V) and 95 to 5 wt.-% of the linear or branched $C_1$-$C_{10}$ alkylalcohol, based on the overall weight of the collector composition.

Additionally or alternatively, the collector composition comprises the alkylated triphenyl phosphorothionate in combination with a single surfactant or a surfactant blend so that an emulsion is obtained when the collector composition is mixed with water. Said surfactant can be an anionic or a non-ionic surfactant.

Non-limiting examples for suitable non-ionic surfactants are ethoxylated branched oxoalcohols or ethoxylated fatty alcohols of formula (VI)

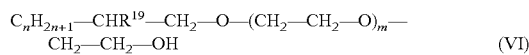

$$C_nH_{2n+1}-CHR^{19}-CH_2-O-(CH_2-CH_2-O)_m-CH_2-CH_2-OH \quad (VI)$$

with $R^{19}$=H or $C_1$-$C_{10}$ alkyl, n in the range of 10 to 15 and m in the range of 3 to 8.

Suitable ionic surfactants are dialkyl sodium sulfosuccinates such as dioctyl sodium sulfosuccinate (CAS-No. 577-11-7).

Preferably, the inventive collector composition comprises, more preferably consists of, 95 to 5 wt.-%, more preferably 75 to 25 wt.-%, still more preferably 50 wt.-% of the alkylated triphenyl phosphorothionate of formula (I), (Ia), (Ib), (Ic), (Id), or (II) to (V) and 95 to 5 wt.-%, more preferably 75 to 25 wt.-%, still more preferably 50 wt.-% of the emulsifier, based on the overall weight of the collector composition.

It may also be desirable to include a froth regulator in the system in order to improve the efficiency. Examples of convenient froth regulators include carbinol such as methyl isobutyl carbinol and alcohols having between 6 and 12 carbon atoms such as ethylhexanol and alkoxylated alcohols.

Further conventional additives may be included in the flotation system, such as pH regulating agents, co-collectors and extender oils like kerosene or diesel oil.

As outlined above, the present invention is also directed to the use of a collector composition comprising an alkylated triphenyl phosphorothionate as defined above for separating a target metal from iron sulphide gangue and/or silicate gangue.

The alkylated triphenyl phosphorothionate can be applied in pure form or in combination with a solvent or emulsifier as outlined above.

It is especially preferred that the target metal is copper, molybdenum, zinc, lead, silver, gold, nickel, ruthenium, osmium, rhodium, iridium, palladium and/or platinum.

The scope and interest of the invention will be better understood based on the following examples which are intended to illustrate certain embodiments of the invention and are non-limitative.

EXAMPLES

The alkylated triphenyl phosphorothionate tris[(2 and 4)-C9-C10-isoalkylphenol]-phosphoro-thionate (CAS-No. 126019-82-7) was used as inventive collector.

The comparative collector is the commercial promoter Aerophine 3418 A by Solvay, which is Sodium Di-isobutyl-di-thiophosphinate solution in water (50-65 wt.-%).

Flotation Test

Following flotation protocol was applied for the different collectors:

The tested ore was a copper-molybdenum ore from Chile containing 0.74 wt.-% copper, 0.026 wt.-% molybdenum and 3.15 wt.-% iron. The ore was prepared for flotation by grinding the ore to a grind size of 80%—150 microns.

400 g of the grinded ore were poured in a 1 L flotation vessel in a Denver flotation cell. 0.933 L tap water was added so that a slurry having a solid content of 30 wt.-% was obtained. The pH was adjusted to 9.6 by addition of hydrated lime. Subsequently, 8.0 mg of the respective collector (20 g/t ore) and 12.0 mg (30 g/t ore) of a frother composition comprising 20 wt.-% glycol and 80 wt.-% methyl isobutyl carbinol were injected. After conditioning the slurry for 3 minutes, the air flow was started and samples for kinetic measurements were taken after 1, 3, 5 and 7 minutes flotation time.

The results of the kinetic measurements showing the grade and recovery of copper, molybdenum and iron after flotation with the inventive and comparative collector composition are summarized in Tables 1 and 2.

TABLE 1

Recoveries of Cu, Mo and Fe using tris[(2 and 4)-C9-C10-isoalkylphenol]-phosphoro-thionate (inventive)

| Interval [min] | Time [min] | Mass [g] | Grade | | | Fine | | | Recoveries | | |
| --- | --- | --- | --- | --- | --- | --- | --- | --- | --- | --- | --- |
| | | | Cu [%] | Mo [%] | Fe [%] | Cu [g] | Mo [g] | Fe [g] | Cu Recalc. Feed Grade | Mo | Fe |
| Feed | 0 | 400 | 0.74 | 0.026 | 3.15 | 2.95 | 0.104 | 12.60 | | | |
| 0-1 | 1 | 16.58 | 10.20 | 0.304 | 14.20 | 1.69 | 0.050 | 2.35 | 58.0% | 51.5% | 20.2% |
| 1-3 | 3 | 8.64 | 8.14 | 0.254 | 12.50 | 0.70 | 0.022 | 1.08 | 82.1% | 73.9% | 29.5% |
| 3-5 | 5 | 2.6 | 4.14 | 0.112 | 8.77 | 0.11 | 0.003 | 0.23 | 85.8% | 76.9% | 31.4% |
| 5-7 | 7 | 1.73 | 2.83 | 0.063 | 7.60 | 0.05 | 0.001 | 0.13 | 87.5% | 78.0% | 32.5% |
| Tail | R | 364 | 0.1 | 0.0059 | 2.16 | 0.36 | 0.021 | 7.86 | | | |
| | | Total 393.55 | | | | Rec. Feed# | 2.91 | 0.098 | 11.66 | | | |

TABLE 2

| | | | Grade | | | Fine | | | Recoveries | | |
|---|---|---|---|---|---|---|---|---|---|---|---|
| Interval [min] | Time [min] | Mass [g] | Cu [%] | Mo [%] | Fe [%] | Cu [g] | Mo [g] | Fe [g] | Cu cab. Recalc. | Mo | Fe |
| Feed | 0 | 400 | 0.74 | 0.026 | 3.15 | 2.95 | 0.104 | 12.60 | | | |
| 0-1 | 1 | 14.68 | 10.70 | 0.265 | 26.50 | 1.57 | 0.039 | 3.89 | 54.5% | 41.8% | 32.3% |
| 1-3 | 3 | 13.25 | 6.22 | 0.192 | 14.55 | 0.82 | 0.025 | 1.93 | 83.1% | 69.1% | 48.3% |
| 3-5 | 5 | 4.04 | 3.42 | 0.101 | 9.31 | 0.14 | 0.004 | 0.38 | 87.9% | 73.5% | 51.4% |
| 5-7 | 7 | 2.7 | 2.42 | 0.061 | 7.54 | 0.07 | 0.002 | 0.20 | 90.2% | 75.3% | 53.1% |
| Tail | R | 360 | 0.0784 | 0.0064 | 1.57 | 0.28 | 0.023 | 5.65 | | | |
| | | Total 394.67 | | | | Rec. Feed# 2.88 | 0.093 | 12.05 | | | |

Recoveries of Cu, Mo and Fe using Aerophine 3418 A (comparative)

FIGS. 1, 2 and 3 show the recovery of Cu, Mo and Fe as a function of the grade and FIGS. 4, 5 and 6 show the recovery of Cu, Mo and Fe as a function of the time interval, respectively As can be gathered from Tables 1 and 2 as well as FIGS. 1 to 6, the inventive collector shows a higher selectivity towards Cu and Mo than the comparative collector. Therefore, the inventive collector is applicable for separating Cu and Mo from Fe more effectively.

The invention claimed is:

1. A method for selectively recovering a sulphide mineral from an ore, the method comprising
   i) grinding the ore to obtain a ground ore,
   ii) preparing a pulp of the ground ore,
   iii) adding at least one collector comprising an alkylated triphenyl phosphorothionate to the pulp, and
   iv) subjecting the pulp containing the at least one collector obtained from step iii) to froth flotation,
   thereby recovering said sulphide mineral.

2. The method according to claim 1, wherein the ore comprises iron sulphide gangue and/or silicate gangue.

3. The method according to claim 1, wherein the at least one collector comprises an alkylated triphenyl phosphorothionate of formula (I)

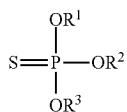

wherein $R^1$ is $C_6$-$C_{10}$ aryl substituted with at least one linear or branched $C_1$-$C_{20}$ alkyl, and $R^2$ and $R^3$ are independently hydrogen, linear or branched $C_1$-$C_{20}$ alkyl or $C_6$-$C_{10}$ aryl which is unsubstituted or substituted with one or more linear or branched $C_1$-$C_{20}$ alkyl.

4. The method according to claim 3, wherein the at least one collector comprises an alkylated triphenyl phosphorothionate of formula (Ia)

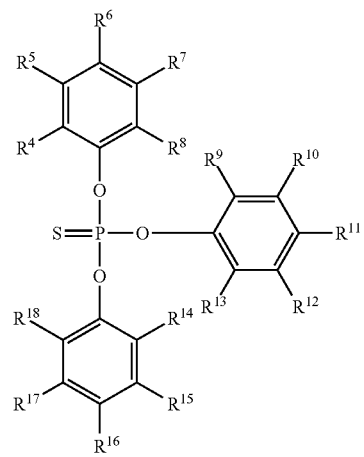

wherein $R^4$ to $R^{18}$ are independently hydrogen or linear or branched $C_1$-$C_{20}$ alkyl with the proviso that at least one of $R^4$ to $R^{18}$ is linear or branched $C_1$-$C_{20}$ alkyl.

5. The method according to claim 3, wherein the at least one collector comprises an alkylated triphenyl phosphorothionate of formula (Ib)

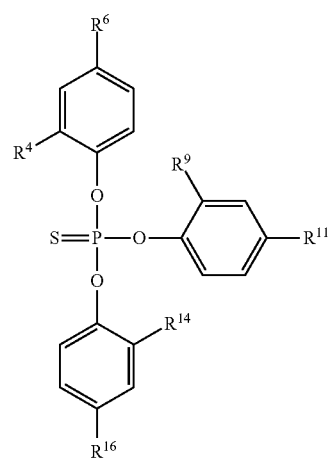

wherein $R^4$, $R^6$, $R^9$, $R^{11}$, $R^{14}$ and/or $R^{16}$ are independently hydrogen or linear or branched $C_1$-$C_{20}$ alkyl with the proviso that at least one of $R^4$, $R^6$, $R^9$, $R^{11}$, $R^{14}$ and/or $R^{16}$ linear or branched $C_1$-$C_{20}$ alkyl.

6. The method according to claim 3, wherein $R^1$, $R^2$ and $R^3$ are phenyl substituted with at least one linear or branched $C_1$-$C_{20}$ alkyl.

7. The method according to claim 6, wherein the at least one collector comprises an alkylated triphenyl phosphorothionate of formula (Ia)

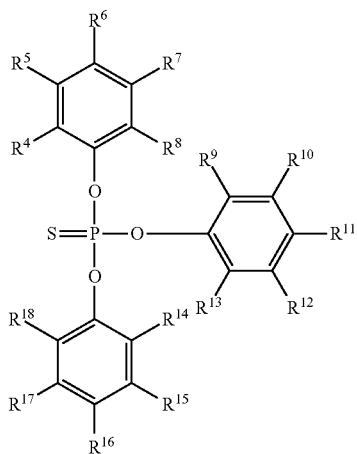

(Ia)

wherein $R^4$ to $R^{18}$ are independently from each other hydrogen or linear or branched $C_1$-$C_{20}$ alkyl with the proviso that at least one of $R^4$ to $R^8$, at least one of $R^9$ to $R^{13}$ and at least one of $R^{14}$ to $R^{18}$ are linear or branched $C_1$-$C_{20}$ alkyl.

8. The method according to claim 6, wherein the at least one collector comprises an alkylated triphenyl phosphorothionate of formula (Ib)

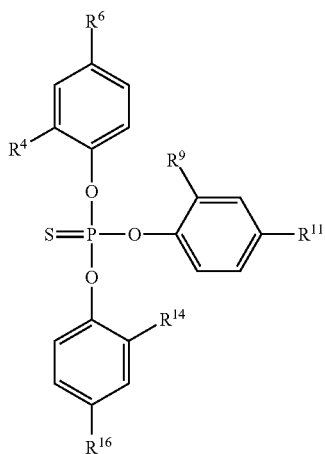

(Ib)

wherein $R^4$, $R^6$, $R^9$, $R^{11}$, $R^{14}$ and/or $R^{16}$ are independently hydrogen or linear or branched $C_1$-$C_{20}$ alkyl with the proviso that at least one of $R^4$ and $R^6$, at least one of $R^9$ and $R^{11}$ and at least one of $R^{14}$ and $R^{16}$ are linear or branched $C_1$-$C_{20}$ alkyl.

9. The method according to claim 3, wherein the at least one collector comprises an alkylated triphenyl phosphorothionate of formula (Id)

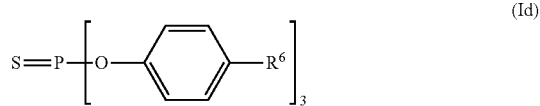

(Id)

wherein $R^6$ is linear or branched $C_1$-$C_{20}$ alkyl.

10. The method according to claim 9, wherein $R^6$ is methyl, ethyl, n-propyl, iso-propyl, n-butyl, sec-butyl, tert-butyl, n-pentyl, 1-methylbutyl, n-hexyl, 1-methylpentyl, n-heptyl, 1-methylhexyl, n-ocyl, n-nonyl, iso-nonyl n-decyl, n-dodecyl and/or iso-dodecyl.

11. The method according to claim 3, wherein the at least one collector comprises an alkylated triphenyl phosphorothionate of formulas (II) to (V):

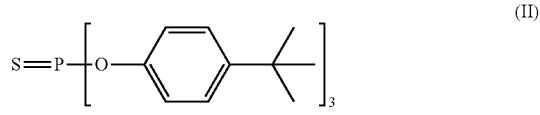

(II)

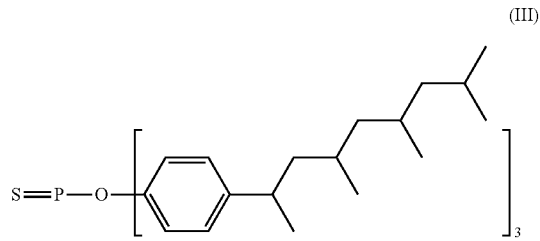

(III)

(IV)

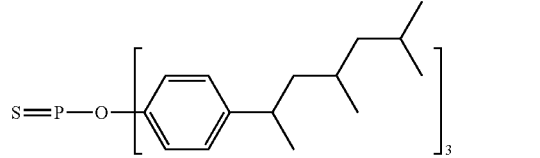

(V)

12. The method according to claim 1, wherein the at least one collector further comprises at least one linear or branched $C_1$-$C_{10}$ alcohol.

13. The method according to claim 12, wherein the at least one linear or branched $C_1$-$C_{10}$ alcohol is selected from the group consisting of 1-butanol, isononanol, 2-ethylhexanol, 2-propylheptanol, and a mixture thereof.

14. The method according to claim 1, wherein the at least one collector further comprises a surfactant.

15. The method according to claim 14, wherein the surfactant is an ethoxylated branched oxoalcohol or ethoxylated fatty alcohol of formula (VI)

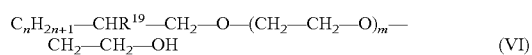

(VI)

with $R^{19}$=H or $C_1$-$C_{10}$ alkyl, n in the range of 10 to 15, and m in the range of 3 to 8.

16. The method according to claim 1, wherein the pulp containing the at least one collector obtained in iii) has a pH value in the range of 8 to 12.

17. The method according to claim 1, wherein the ore comprises iron and at least one selected from the group consisting of copper, molybdenum, zinc, lead, silver, gold, nickel, ruthenium, osmium, rhodium, iridium, palladium, and platinum.

18. A separating method, comprising:
    separating a target mineral from iron sulphide gangue and/or silicate gangue using at least one collector comprising an alkylated triphenyl phosphorothionate.

19. The method according to claim 18, wherein the target mineral contains copper, molybdenum, zinc, lead, silver, gold, nickel, ruthenium, osmium, rhodium, iridium, palladium and/or platinum.

* * * * *

UNITED STATES PATENT AND TRADEMARK OFFICE
CERTIFICATE OF CORRECTION

| | |
|---|---|
| PATENT NO. | : 11,612,897 B2 |
| APPLICATION NO. | : 16/614642 |
| DATED | : March 28, 2023 |
| INVENTOR(S) | : Adrian Mauricio Villanueva Berindoague |

It is certified that error appears in the above-identified patent and that said Letters Patent is hereby corrected as shown below:

On the Title Page

Item (56), Column 2, Line 2, CL 198500358 in FOREIGN PATENT DOCUMENTS currently reads, "6/1995" and should read --6/1985--.

Signed and Sealed this
Sixth Day of June, 2023

Katherine Kelly Vidal
*Director of the United States Patent and Trademark Office*